No. 619,024. Patented Feb. 7, 1899.
L. DE RAVEL.
APPARATUS FOR GENERATING ACETYLENE GAS.
(Application filed Nov. 20, 1897.)
(No Model.) 2 Sheets—Sheet 1.
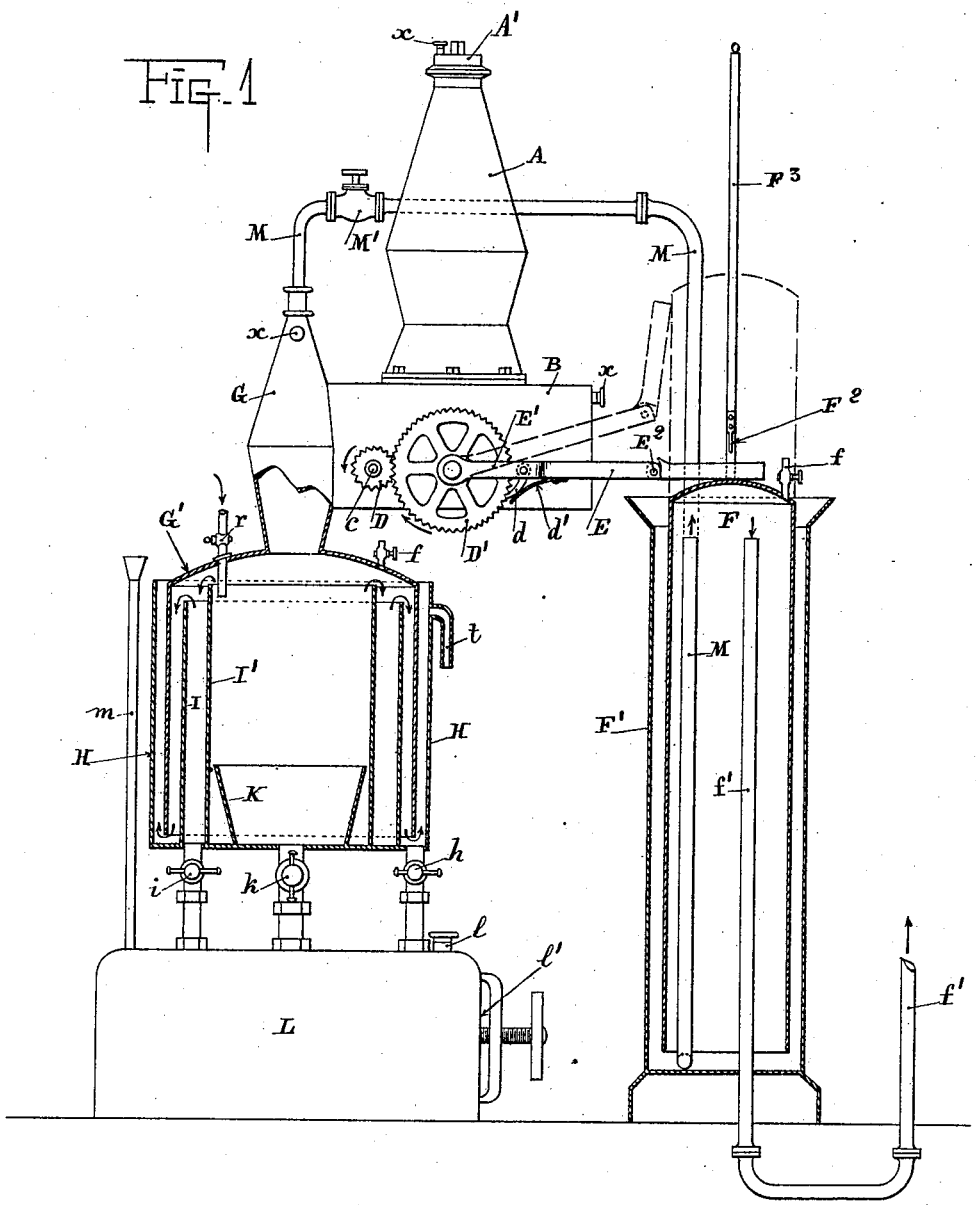

No. 619,024. Patented Feb. 7, 1899.
L. DE RAVEL.
APPARATUS FOR GENERATING ACETYLENE GAS.
(Application filed Nov. 20, 1897.)
(No Model.) 2 Sheets—Sheet 2.
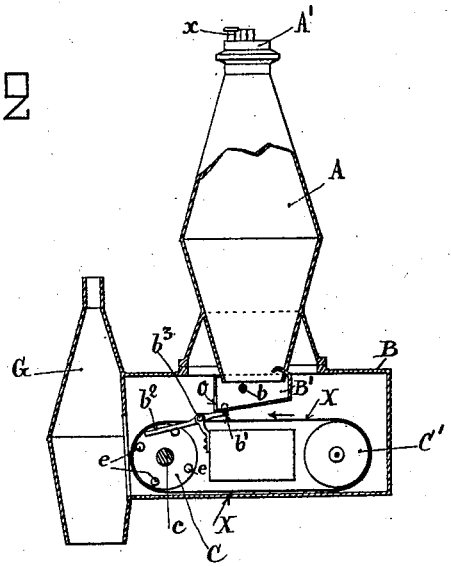
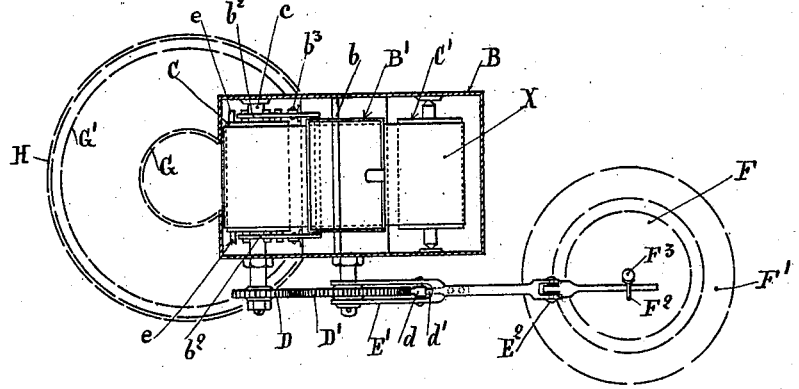

UNITED STATES PATENT OFFICE.

LOUIS DE RAVEL, OF MARSEILLES, FRANCE.

APPARATUS FOR GENERATING ACETYLENE GAS.

SPECIFICATION forming part of Letters Patent No. 619,024, dated February 7, 1899.

Application filed November 20, 1897. Serial No. 659,257. (No model.)

*To all whom it may concern:*

Be it known that I, LOUIS DE RAVEL, a citizen of the Republic of France, residing at Marseilles, France, have invented certain new and useful Improvements in Apparatus for the Generation of Acetylene Gas, (for which Letters Patent have been obtained in France, No. 266,938, dated May 18, 1897,) of which the following is a full, clear, and exact description.

This invention has relation to apparatus for generating acetylene gas, and has for its object, among others, to provide a simple apparatus adapted for producing acetylene gas economically; and the invention consists in the novel construction, arrangement, and combination of parts, as hereinafter fully described, and pointed out in the appended claims.

The apparatus of this specification is shown, for example, on the annexed drawings, of which—

Figure 1 is a sectional elevation of the gas-generator and of the gasometer. Fig. 2 is a sectional elevation showing the transporter and distributer. Fig. 3 is a plan of the same.

As shown on the drawings, my apparatus is composed of four distinct parts—first, the distributer; second, the gas-generator; third, the lime-tank, and, fourth, the gasometer.

The distributer is formed of a hopper A, hermetically closed at A', disposed upon an automatic transporter shut in a box B. In the box B and beneath the hopper is mounted a receiver B', which may oscillate on a transverse shaft $b$ and under the impulse of a cross-bar $b'$, with arm $b^2$, oscillating in $b^3$, as will be explained further. Under the receiver B' is arranged an endless band X, made of an appropriate substance and carried by two rollers or cylinders C C'. The shaft $c$, which carries the cylinder C, is provided at the outside of the case B with a pinion D, gearing into a toothed wheel D', with pawl $d$, which causes it to rotate in the direction shown by the arrow, Fig. 1. The pinion D, which is also turned in the direction shown by its arrow, Fig. 1, will make the internal cylinder C rotate in the same direction, so as to bring from the receiver to the gas-generator the carbid of calcium which will have fallen through the opening $o$ onto the band X. The fall of the carbid of calcium onto the band is insured by the oscillations communicated to the receiver by the fingers $e$, fixed at the extremities of the cylinder C, and which have for their object to raise and lower successively the oscillating arm $b^2$ of the cross-bar $b'$, before mentioned. The pawl $d$ is maintained in contact with the wheel D' by a spring $d'$.

The travel of the transporter and the oscillations of the receiver are effected by a lever E, with forks E', pivoted on the axle of the wheel D' and actuating it by the pawl $d$ at each descent. The lever E is jointed at $E^2$ and is raised by the bell F of the gasometer F' and lowered with it by coming against a projection $F^2$, fixed to the guide-rod $F^3$. The bell F is provided at its top with a valve $f$ for the exhaust of air. A tube $f'$ for the outlet of the gas is placed in the bell and passes under the bottom thereof to go to the burners.

As hereinbefore stated, the carbid of calcium falls from the receiver onto the endless band X. From this band the carbid of calcium falls into the gas-generator, which is formed of a funnel-shaped upper part G in communication with the box B. The bottom of the funnel-shaped portion is in communication with a fixed bell G', integral with an exterior vessel H, with a waste-pipe $t$. Concentrically within the exterior vessel H are two other vessels I and I', the vessel I' being higher than I. Finally, in the center of the central vessel I' is disposed a tank K for receiving the carbid of calcium falling from the transporter. The vessels H I and the tank K are in communication with a lime-tank L by means of pipes with cocks $h$ $i$ $k$. The lime-tank is besides provided with a cock $l$ for the admission of air and of an opening $l'$ for the cleaning of the tank. A safety-tube $m$ completes the lime-tank.

At the upper part of the fixed bell G' and above the central vessel I' is fixed a tube with cock $r$ for the inlet of water, which it directly pours into this vessel at the time of the charging. At the top of the part G is connected a conduit M, with cock M', for the passage of the gas from the gas-generator to the gasometer already described.

In operation, some carbid of calcium having been placed within the vessel K, a small quantity of water is admitted through cock $r$ and coming in contact with the carbid of calcium acetylene gas is generated, which rises through the funnel-shaped casing G and passes by pipe M to the interior of the gasometer. The accumulation of gas beneath the bell F causes the latter to rise, carrying with it the lever E. As soon as the gas-pressure is reduced beneath the bell F by use at the burners the said bell will fall, and this causes oscillation of the lever E to turn the gear-wheels D' D in the direction of the arrows, and consequently turning the cylinder C, and as a finger thereon clears the end of the arm $b^2$ the latter falls, and thus oscillates the receiver B' to cause it to deposit some carbid of calcium contained thereby onto the band X, and as the latter moves slightly forward it will deposit the carbid of calcium into the generator through casing G, said carbid of calcium falling into the receiver K. If necessary, more water is now supplied, and the resultant gas will flow into the gasometer to cause it to again rise, as before described, and this operation is repeated each time that it becomes necessary to replenish the gas within the gasometer.

It will be understood that suitable liquid seals are provided for the bell F and the vessels I I' and bell G' to prevent escape of gas under ordinary pressures.

What I claim, and desire to secure by Letters Patent, is—

1. In an apparatus for generating acetylene gas, the combination with a gas-generating chamber, of a carbid-of-calcium receiver, a vertically-movable gasometer-bell in communication with said chamber, a box arranged beneath the carbid-of-calcium receiver, an oscillatable receiver B', a cross-bar $b'$ having an arm $b^2$, adapted to be oscillated and to oscillate the said receiver B', an endless band adapted to travel beneath the latter and to discharge carbid of calcium into the gas-generating chamber, rollers mounted upon shafts and carrying the endless band, a series of pins on one of said rollers adapted to successively strike the arm $b^2$, intermeshing gear-wheels mounted on the roller-shafts, a lever E pivotally mounted at one end upon one of the shafts and having a jointed section at the other end adapted to be actuated by the gasometer as described, and a pawl carried by the lever and engaging one of the gear-wheels to actuate the same at each descent of the gasometer and cause the movement of the endless band in the manner and for the purpose set forth.

2. In an apparatus for generating acetylene gas, the combination with a gas-generating device composed of vessels H I I' arranged as described, the fixed bell G', the vessel K within the innermost vessel I' and the funnel-shaped portion G rising from the bell G', of a gasometer in communication with the portion G, a gasometer-bell adapted to rise and fall in the gasometer, a chamber L in communication with the vessel K, a carbid-of-calcium receiver, and means for feeding carbid of calcium at intervals from the carbid-of-calcium receiver to the vessel K comprising a box arranged beneath the receiver, an oscillatable receiver B', a cross-bar $b'$ having an arm $b^2$, adapted to be oscillated and to oscillate the said receiver B', an endless band adapted to travel beneath the latter and to discharge carbid of calcium into the gas-generating chamber, rollers mounted upon shafts and carrying the endless band, a series of pins on one of said rollers adapted to successively strike the arm $b^2$, intermeshing gear-wheels mounted on the roller-shafts, a lever E pivotally mounted at one end upon one of the shafts and having a jointed section at the other end adapted to be actuated by the gasometer as described, and a pawl carried by the lever and engaging one of the gear-wheels to actuate the same at each descent of the gasometer and cause the movement of the endless band in the manner and for the purpose set forth.

In testimony that I claim the foregoing I have hereunto set my hand this 3d day of November, 1897.

LOUIS DE RAVEL.

Witnesses:
LOUIS PIOTZ,
WM. H. CHAMLY.